Dec. 20, 1949      A. DE HERAS ET AL      2,491,803
STEERING WHEEL COVER
Filed Aug. 20, 1949
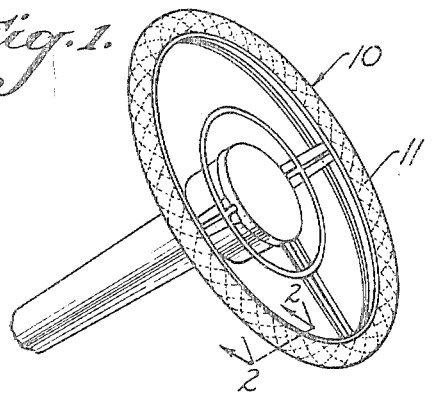
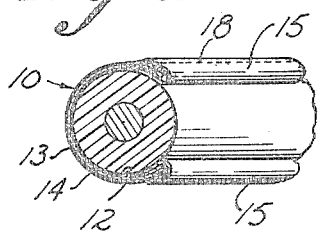
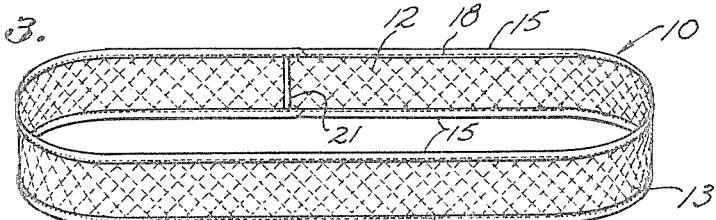
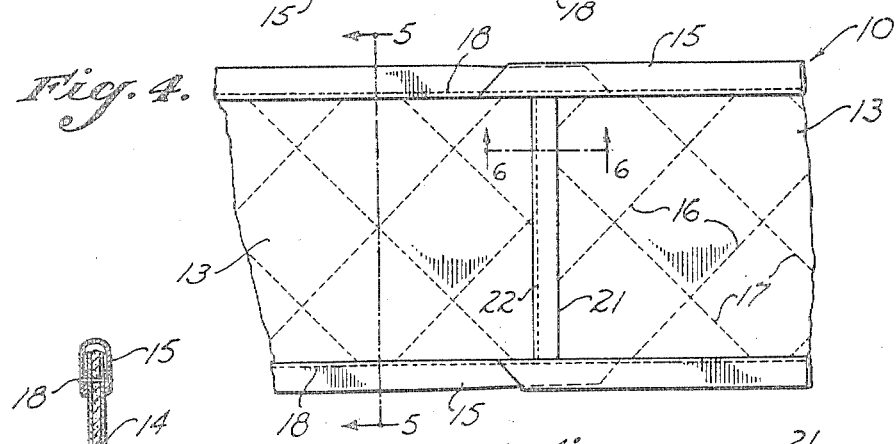
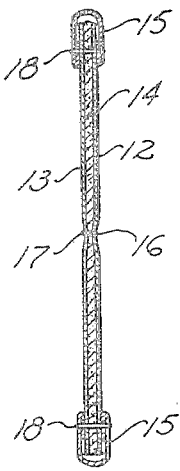
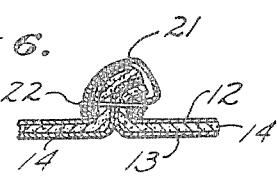
ARMAND DE HERAS
DONALD G. BOWDEN
INVENTORS
BY *Forrest J. Tilly*
ATTORNEY.

Patented Dec. 20, 1949

2,491,803

UNITED STATES PATENT OFFICE 2,491,803

STEERING WHEEL COVER

Armand de Heras and Donald G. Bowden, Los Angeles, Calif., assignors to Armand Manufacturing, Inc., Los Angeles, Calif., a corporation of California Application August 20, 1949, Serial No. 111,546

8 Claims. (Cl. 74—558)

This invention relates to steering wheel covers, and its object is the provision of a simple and improved steering wheel cover having the combined qualities of quick and convenient application to or removal from a steering wheel, snugness of fit after application, good gripping qualities, considering both the grip of the cover to the wheel and the grip of the hands of the user to the covered wheel, attractiveness of appearance, durability, and economy.

The article of the invention may be described generally as comprising an endless band formed of plastic film or sheet material, diagonally or bias-stitched, so as to give a "quilted" effect, and provided with edge bindings stitched longitudinally with plastic thread. The plastic sheet material is naturally somewhat elastic, and the diagonal stitching preserves this elasticity, so that the article is capable of conforming snugly to the shape of the wheel. The longitudinally stitched edge bindings, however, have less elasticity or stretch, and while capable of stretching sufficiently to permit the cover to be worked on over the wheel, tend to hold to a normal size which is sufficiently smaller than the outside diameter of the wheel that the cover is taut after installation, and is not readily stretched sufficiently to come off the wheel, unless deliberate effort is made to accomplish that result.

The cover of the invention will more readily be understood from the following detailed description of a present illustrative embodiment thereof, reference for that purpose being had to the accompanying drawings, in which:

Figure 1 is a perspective view of the steering wheel cover of the invention installed on a steering wheel;

Figure 2 is a cross section of a steering wheel with the cover installed thereon;

Figure 3 is a perspective view of the wheel cover of the invention;

Figure 4 is a fragmentary side elevational view of the inner side thereof;

Figure 5 is a transverse section on line 5—5 of Figure 4; and

Figure 6 is a detail enlarged section on line 6—6 of Figure 4.

In the drawings (wherein the wall thicknesses of the materials are necessarily shown with exaggerated thicknesses), numeral 10 designates generally the wheel cover of the invention, shown in Figure 1 as installed on a steering wheel 11. The cover consists of an annular or endless ring or band formed of the two inner and outer strips 12 and 13 composed of a somewhat elastic, thin plastic sheet or film material, typically of about .004" in thickness. Preferably, this material is a virgin vinyl plastic film, of a type well known and readily available commercially. Such material is strong and durable, has a natural attractive glossy surface, is available in many colors, and has especially good non-slip characteristics when sewed as hereinafter explained and then stretched tightly over the wheel. Its elastic stretching qualities are considerable, enabling it to conform snugly to the contour of the wheel without wrinkling or looseness after the installation has been made. Between these bands 12 and 13 is preferably enclosed a layer of cotton wadding or filter 14 (see Figure 5) and the two longitudinal edges of the band assembly as thus described are covered by edge binding strips 15, also formed of the same plastic film.

The band assembly consisting of inner and outer strips 12 and 13 together with cotton wadding 14 is "quilted," that is to say, it is stitched through diagonally, or on the bias, by parallel lines of stitching extending across the band in both directions, as indicated at 16 and 17. The stitching is preferably done with a plastic thread, such as nylon, or the like, having great strength and lasting qualities, as well as a certain degree of resilience. This diagonal stitching or quilting has several purposes and beneficial results, including not only enhancement of the appearance of the article, and increase in its strength and durability, but improvement in the non-slip quality of the grip of the article against the steering wheel, as well as improvement in the grip between the hands and the covered wheel. In addition, the bias stitching permits a variable degree of longitudinal stretch of the band, permitting the same to accommodate itself to the size and contour of the wheel, the central regions of the band of course remaining stretched to the maximum degree after installation, while the degree of stretch becomes progressively less and less toward the side edges. Clearly, the same effect would not be had with longitudinal and transverse stitching.

The edge binding strips 15 are sewed, preferably also with plastic thread, such as nylon, and this stitching, indicated at 18, is parallel with the edges of the band, and therefore longitudinally thereof. In consequence, while the thread employed for this edge binding stitching has some limited degree of stretch, the stretch is not nearly so pronounced as within the central regions of the diagonally stitched band, and the band has the characteristic of substantial stretchability in a longitudinal direction particularly in its central regions, but only a limited degree of stretchability along its bound, longitudinally stitched edges.

The two ends of the band as thus described are brought together, turned inward, covered with a transverse strip 21 of plastic material, and then stitched through, as indicated at 22 (Figure 6), to form the endless band.

The cover as thus described is installed by working it over the wheel a little at a time, progressing circularly around the cover. The longitudinally stitched edge binding will stretch sufficiently to permit the cover to go on rather tightly over the wheel (assuming of course proper sizing of the cover for the wheel), and then contracts as the cover is adjusted over the outer periphery of the wheel all around. As earlier described, the central longitudinal region of the cover has a substantial degree of stretchability, owing to the elastic nature of the plastic material together with the diagonal or bias type of stitching, so that the cover comes finally into adjustment with its longitudinally extending central or medial region stretched tightly around the wheel, but without substantial strain on the diagonal stitching. The cover conforms snugly to the wheel around the sides of the latter to its bound edges, which remain taut, but assume a substantially unstretched condition. The cover as thus applied is tight to the wheel all around, is free from looseness or wrinkling, and hugs the wheel with a non-slipping grip. By the same token, the hands of the user secure a firm, non-slipping grip on the covered wheel. The materials of the cover are durable, and the construction is such that the materials are not under undue strain after installation, the only portions of the cover which are in a stretched condition having been designed to take such stretch without undue strain such as would tend in time to break the stitching. Finally, all materials are of a type capable of standing up in service over a long period of time.

A preferred embodiment of the invention has now been described, but it will of course be understood that this is for illustrative purposes only, and that various changes may be made without departing from the spirit and scope of the invention.

We claim:

1. An endless steering wheel cover comprising inner and outer normally substantially flat bands of thin elastic material sewed to one another by stitching which extends diagonally across the bands in both directions.

2. An endless steering wheel cover comprising inner and outer normally substantially flat bands of thin elastic material sewed to one another by stitching which extends diagonally across the bands in both directions, and longitudinal edge binding strips of thin elastic material overlapping the longitudinal edges of said sewed-together bands and sewed to said bands by stitching extending longitudinally of the bands.

3. An endless steering wheel cover comprising inner and outer normally substantially flat bands of thin elastic material and an intermediate layer of filler material, all sewed to one another by stitching which extends diagonally across the bands in both directions, and longitudinal edge binding strips of thin elastic material overlapping the longitudinal edges of said sewed-together bands and sewed to said bands by stitching extending longitudinally of the bands.

4. An endless steering wheel cover comprising inner and outer normally substantially flat bands of elastic plastic film sewed to one another by lines of parallel stitching which extend diagonally across the bands in both directions in a quilted fashion.

5. An endless steering wheel cover comprising inner and outer normally substantially flat bands of elastic plastic film sewed to one another by lines of parallel stitching which extend diagonally across the bands in both directions in a quilted fashion, and longitudinal edge binding strips of elastic plastic film overlapping the longitudinal edges of said bands and sewed to said bands by stitching extending longitudinally of the bands.

6. An endless steering wheel cover comprising inner and outer normally substantially flat bands of elastic plastic film sewed to one another by lines of parallel stitching which extend diagonally across the bands in both directions in a quilted fashion, and longitudinal edge binding strips of elastic plastic film overlapping the longitudinal edges of said bands and sewed to said bands by stitching extending longitudinally of the bands, the stitches employed to quilt the band and to sew the edge binding strips to the band being formed of plastic thread.

7. An endless steering wheel cover comprising inner and outer normally substantially flat bands of thin elastic material and an intermediate layer of filler material, all sewed to one another by stitching which extends diagonally across the bands in both directions, and longitudinal edge binding strips of elastic plastic film overlapping the longitudinal edges of said bands and sewed to said bands by stitching extending longitudinally of the bands, the stitches employed to quilt the band and to sew the edge binding strips to the band being formed of plastic thread.

8. An endless steering wheel cover comprising inner and outer normally substantially flat bands of thin elastic plastic film and an intermediate layer of cotton filler material, all sewed to one another by lines of stitching which extend diagonally across the bands in both directions in a quilted fashion, and longitudinal edge binding strips of elastic plastic film overlapping the longitudinal edges of said bands and sewed to said bands by stitching extending longitudinally of the bands.

ARMAND DE HERAS.
DONALD G. BOWDEN.

REFERENCES CITED

The following references are of record in the file of this patent:

UNITED STATES PATENTS

| Number | Name | Date |
| --- | --- | --- |
| 1,168,146 | Barnes | Jan. 11, 1916 |
| 2,157,950 | Best | May 9, 1939 |